3,293,301
PREPARATION OF CARVONE
John M. Derfer, Jacksonville, Bernard J. Kane, Atlantic Beach, and Donald G. Young, Jacksonville, Fla., assignors to The Glidden Company, Cleveland, Ohio, a corporation of Ohio
No Drawing. Filed Apr. 7, 1964, Ser. No. 358,051
13 Claims. (Cl. 260—587)

The present invention relates to the preparation of carvone.

Carvone is an important constituent of many essential oils. About 65% of spearmint oil is l-carvone and d-carvone is the chief constituent of caraway and dill seed oils.

The preparation of l-carvone from d-limonene has been described by Bordenca et al., Ind. and Eng. Chem. 43 1196 (1951) and by Reitsema, U.S. Patent No. 2,802,874. The general procedure involves treating d-limonene with nitrosyl chloride to form d-limonene nitrosochloride, dehydrohalogenating the nitrosochloride to form l-carvoxime, and hydrolyzing the carvoxime to l-carvone. The reactions can be indicated by the following equations:

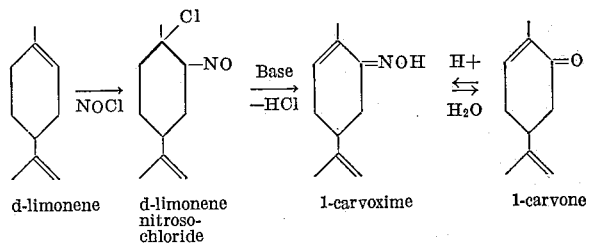

d-limonene   d-limonene       l-carvoxime      l-carvone
             nitroso-
             chloride These various reactions were carried out after isolation of the respective intermediates.

It is an object of the present invention to provide an improved process for producing carvone.

A further object is to provide an improved procedure for carrying out the reactions indicated in the foregoing series of equations.

In accordance with the present invention at least the dehydrohalogenation and hydrolysis steps are carried out without isolation of the intermediate carvoxime. Preferably also the dehydrohalogenation is carried out in the same reaction vessel as is used for the preparation of the nitrosochloride and without isolation of the nitrosochloride.

In our study of the reactions involved in the overall procedure, we have also developed several other novel procedures related to the overall process.

We have found, for example, that it is not necessary to add any basic material such as alkali, basic salts, amines, or other material capable of reacting with HCl for the dehydrochlorination step. In fact it is a feature of our invention that no such material is used for the removal of HCl to form the carvoxime.

We have also discovered that it is not necessary to use an excess of acid for the hydrolysis step, and that the amount of HCl formed during the dehydrochlorination is sufficient, if there is provided an excess of a substance capable of binding hydroxylamine, such as a ketone or aldehyde. When such a hydroxyl amine binding agent is present it reacts with the hydroxylamine formed and removes the amine from the reaction. This makes it unnecessary to add increments of acid during the hydrolysis as is necessary in the Bordenca et al. and Reitsema procedures in order to maintain the pH within the narrow range found to be most suitable for this reaction. We prefer, however, to add not more than one mole of additional acid per mole of carvoxime at the beginning of the hydrolysis. Phosphoric acid is the preferred additional acid.

Also, by using an acceptor for the hydroxylamine it is not necessary to remove the carvone during the hydrolysis as in Reitsema, since there is an equilibrium between carvoxime and its hydrolysis products, carvone and hydroxylamine, and the reaction can be carried to completion before any recovery of the carvone is required.

We have found that the objects of the invention can be achieved when the reactions are carried out in a suitable solvent such as a lower aliphatic alkanol. The preferred solvent is isopropyl alcohol. But any other solvent for carvoxime and carvone which is water soluble, nonreactive with the reacting materials, and which has a boiling point of at least about 75° C. or higher can be used. Thus ethyl alcohol, normal propyl alcohol, 1,2-dimethoxyethane and tetrahydropyran are also suitable. It has been found that for the dehydrochlorination a temperature of about 80–85° C. is quite satisfactory. Isopropyl alcohol boils in this range and thus at reflux temperatures provides an excellent temperature control.

Tertiary butyl alcohol can also be used for the dehydrochlorination and hydrolysis steps but since it melts at about 25° C. it is not suitable for the preparation of the nitrosylchloride since this is preferably carried out at 0° C. or lower.

Methyl alcohol is not suitable as a solvent for the preparation of the nitrosylchloride since it reacts and leads to by-product l-methoxy dihydrocarvone in the final reaction mixture.

Any water-soluble aldehyde or ketone can be used as the hydroxylamine accepter including for example $C_{1-6}$ aliphatic and cycloaliphatic aldehydes and ketones. Acetone and methyl ethyl ketone have been found quite suitable but cyclohexanone, formaldehyde and acetaldehyde are also suitable. Stearone was found not to be suitable.

It is preferred to use gaseous nitrosylchloride for the treatment of the limonene. Also it is desirable to effect as complete a conversion of the limonene to the nitrosochloride as is practical since unconverted limonene carried into the dehydrochlorination step is hydrated to terpineol during the subsequent hydrolysis step. The terpineol is difficult to separate from the carvone. Consequently an excess of nitrosylchloride is preferably employed. However, if as much as a 60% excess is used as much terpineol is formed as at equimolecular amounts. The preferred amount is from 1 to 1.6 moles of nitrosylchloride per mole of limonene, the optimum ratio being about 1.2 to 1.

The following examples are illustrative of the invention:

Example 1

A three-litre, 3-necked flask is charged with one mole, 136 grams, of d-limonene, $\alpha_D = +110.9°$, and 200 ml. of isopropanol. This mixture is stirred at −10° C. while 81 grams of nitrosylchloride, 1.23 moles, is bubbled in below the surface at such a rate as to maintain the temperature below 0° C., which requires about 45 minutes. After addition of nitrosylchloride is complete the mixture is stirred for 3 hours at 0° C.

For dehydrochlorination an additional 400 ml. of isopropanol is added to the thus prepared slurry and the mixture is heated to reflux, about 80° C., for 30 minutes.

For hydrolysis 715 ml. of acetone and 500 ml. of water are added to the thus prepared mixture and heated at reflux for 4 hours. The flask is then cooled and the mixture neutralized with sodium carbonate about 53 grams, one-half mole, being required. The isopropanol and excess acetone are then stripped off and the oil is cohobated from the acetone flask to yield 95 to 100 grams of oil containing 75 to 80% 1-carvone. Fractionation of the carvone from the oil produces 1-carvone with a specific rotation of $\alpha_D$, $-60.5°$.

*Example 2*

In a preferred procedure a three-litre, 3-necked flask is equipped with a stirrer, gas inlet tube and thermometer and is charged with 136 grams of d-limonene, $\alpha_D=110.9°$ previously fractionated at 5:1 at 100 mm. and 200 ml. of anhydrous isopropanol. This mixture is cooled to $-5°$ C. and nitrosylchloride is slowly bubbled in below the surface of the liquid at such a rate as to maintain the temperature below 0° C. After 80 grams of nitrosylchloride has been added the slurry is stirred for an additional hour at 0° C. For dehydrochlorination of the limonene nitrosochloride, an additional 200 ml. of anhydrous isopropanol is added to the slurry and the mixture is slowly heated to reflux. The reaction is somewhat exothermic at this point and care should be taken to prevent flooding of the condenser. As soon as reflux starts, addition of acetone is started, the rate being adjusted so that 300 ml. are added over thirty minutes. Hydrolysis of the oxime is commenced immediately after the addition of acetone is completed by the addition of 500 ml. of water containing 57 grams of dissolved phosphoric acid. The aqueous acid is added at reflux over a thirty-minute period and reflux continued for an additional 3½ hours. A vacuum is then applied and solvents removed until the reaction mixture appears cloudy and a dark oil layer separates. The temperature of the pot is maintained below 40° C. once it has descended to this point.

The oil layer is separated from the mixture and the water layer extracted 4 times with 200 ml. of portions of benzene. The extracts are combined, washed neutral with aqueous sodium bicarbonate solution and water. The benzene is then distilled to azeotrope the solution dry and after removal the oil is distilled at 4 mm. The yield is 97–100 grams of oil containing 91 to 95% carvone. This corresponds to 65 to 70% weight yield based on starting limonene or 59–63% theoretical yield. This is about an average of 85% theoretical yield at each of the three stages of the procedure.

The foregoing examples are illustrative. It will be appreciated that if one starts with 1-limonene that the end-product will be d-carvone, and that dl-limonene, dipentene, would lead to dl-carvone. Thus the procedure provides a means for producing carvone of whatever degree or kind of optical activity desired in good yield.

We hereby claim:

1. The process of converting limonene to carvone involving (1) converting limonene to limonene nitrosochloride by treatment with nitrosylchloride, (2) dehydrochlorinating the limonene nitrosochloride thus formed to carvoxime, and (3) hydrolyzing the thus formed carvoxime to carvone, characterized in that: (a) steps 1, 2, and 3 are carried out in the presence of a water-soluble nonreactive solvent selected from the group consisting of isopropyl alcohol, ethyl alcohol, normal propyl alcohol, 1,2-dimethoxyethane, and tetrahydropyran and having a boiling point of at least 75° C.; (b) step 2 consists essentially in heating the mixture formed in step 1 to at least 75° C. in the absence of a base until the nitrosochloride is substantially dehydrochlorinated; (c) adding water, an excess of a water-soluble carbonylic compound selected from the group consisting of $C_{1-6}$ aliphatic and cycloaliphatic aldehydes and ketones and not more than 1 mol of water-soluble acid, based on the carvoxime to the mixture formed in step 2; (d) heating the homogeneous mixture formed by (c) to hydrolyze the carvoxime to carvone, thereafter recovering carvone from the heated mixture by distillation; and (e) further characterized in that all of the foregoing steps and procedures are carried out without the isolation of intermediates.

2. The process of claim 1 in which the solvent is isopropyl alcohol.

3. The process of claim 1 in which the carbonylic compound is a ketone.

4. The process of claim 3 in which the solvent is isopropyl alcohol and the ketone is acetone.

5. The process of claim 1 in which phosphoric acid is added in (c).

6. The process for hydrolyzing carvoxime to carvone which consists essentially in heating a homogeneous solution of carvoxime in a water-miscible solvent selected from the group consisting of isopropyl alcohol, ethyl alcohol, normal propyl alcohol, 1,2-dimethoxyethane, and tetrahydropyran, water, and a water-miscible carbonylic compound selected from the group consisting of $C_{1-6}$ aliphatic and cycloaliphatic aldehydes and ketones; said carbonylic compound being present in the stoichiometric excess of the carvoxime and in the presence of not more than 2 mols of acid based on the carvoxime and thereafter recovering carvone from the heated solution by distillation.

7. The process of dehydrochlorinating limonene nitrosochloride which consists essentially in heating a slurry of limonene nitrosochloride and a water-miscible nonreactive solvent selected from the group consisting of isopropyl alcohol, ethyl alcohol, normal propyl alcohol, 1,2-dimethoxyethane, and tetrahydropyran, at a temperature above about 75° C. in the absence of any added base.

8. The process of converting limonene nitrosochloride to carvone involving (1) the dehydrochlorination of the nitrosochloride to carvoxime and (2) hydrolysis of the carvoxime to carvone characterized in that: step 1 consists essentially in heating a slurry of limonene nitrosochloride in a water-soluble nonreactive solvent selected from the group consisting of isopropyl alcohol, ethyl alcohol, normal propyl alcohol, 1,2-dimethoxyethane, and tetrahydropyran, at a temperature of at least 75° C. in the absence of any added base until the nitrosochloride is substantially dehydrochlorinated, and step 2 consists essentially in adding water, not more than 1 mol of water-soluble acid and an excess of a water-miscible carbonylic compound selected from the group consisting of $C_{1-6}$ aliphatic and cycloaliphatic aldehydes and ketones to the solution of carvoxime produced in step 1, heating the resulting homogeneous mixture to hydrolyze the carvoxime to carvone and thereafter recovering carvone from the heated mixture by distillation.

9. The process of claim 8 in which the solvent is isopropyl alcohol.

10. The process of claim 8 in which the carbonylic compound is a ketone.

11. The process of claim 10 in which the solvent is isopropyl alcohol and the ketone is acetone.

12. The process of claim 8 in which phosphoric acid is added in step (2).

13. In a process for converting limonene to carvone consisting of (1) reacting limonene with nitrosylchloride to form limonene nitrosochloride (2) dehydrochlorinating limonene nitrosochloride in the presence of a base to remove free HCl formed during said dehydrochlorination and to form carvoxime and (3) hydrolyzing carvoxime to carvone; the improvement for converting limonene to carvone in situ and in high yields without the isolation and purification of intermediate limonene nitrosochloride and/or carvoxime which comprises: (a) reacting said limonene with gaseous nitrosylchloride in the presence of liquid phase lower aliphatic alkanol having a boiling point of at least 75° C., thereby forming a dispersion consisting essentially of limonene nitrosochloride in said alkanol, (b) dehydrochlorinating said limonene nitrosochloride in the absence of a base by boiling the mixture of said limonene nitrosochloride and said alkanol, thereby forming a solution containing carvoxime dissolved in said alkanol, (c) hydrolyzing said carvoxime to carvone in said solution in the presence of added water, an excess of acetone and not more than one mole of a water soluble acid per mol of carvoxime in said solution, thereby forming a distilland containing carvone and ketoxime, and (4) recovering carvone from said distilland by fractional distillation.

References Cited by the Examiner

Bordenca et al., "Ind. and Eng. Chem.," vol. 43, pp. 1196 to 1198 (1951).

Royals, "J. Am. Chem. Soc.," vol. 73, pp. 5856 to 5857 (1951).

Reitsma, "J. Org. Chem.," vol. 23, 2038 to 2040 (1958).

Wagner et al., "Synthetic Org. Chem.," pp. 286, 336 and 337 (1953).

BERNARD HELFIN, *Primary Examiner.*

LEON ZITVER, *Examiner.*

M. M. JACOB, *Assistant Examiner.*